United States Patent
Li et al.

(10) Patent No.: US 11,232,470 B2
(45) Date of Patent: Jan. 25, 2022

(54) CUSTOMER FLOW LINE AND CUSTOMER FLOW HOT ZONE DETERMINING METHOD AND APPARATUS

(71) Applicant: BOE TECHNOLOGY GROUP CO., LTD., Beijing (CN)

(72) Inventors: Hui Li, Beijing (CN); Guohe Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/760,701

(22) PCT Filed: Aug. 26, 2019

(86) PCT No.: PCT/CN2019/102633
§ 371 (c)(1),
(2) Date: Apr. 30, 2020

(87) PCT Pub. No.: WO2020/043070
PCT Pub. Date: Mar. 5, 2020

(65) Prior Publication Data
US 2020/0349594 A1 Nov. 5, 2020

(30) Foreign Application Priority Data
Aug. 31, 2018 (CN) .......................... 201811015132.6

(51) Int. Cl.
*G06Q 30/02* (2012.01)
(52) U.S. Cl.
CPC ..... *G06Q 30/0205* (2013.01); *G06Q 30/0201* (2013.01)

(58) Field of Classification Search
CPC ....................... G06Q 30/0205; G06Q 30/0201
(Continued)

(56) References Cited

U.S. PATENT DOCUMENTS

| 2004/0111454 | A1* | 6/2004 | Sorensen | ............... | G06Q 30/02 708/200 |
| 2013/0054142 | A1* | 2/2013 | Moriguchi | ............. | G06Q 10/06 701/519 |

(Continued)

FOREIGN PATENT DOCUMENTS

| CN | 102737336 A | 10/2012 |
| CN | 103065464 A | 4/2013 |

(Continued)

OTHER PUBLICATIONS

RFID study tracks supermarket shopper pattern Anonymous. Drug Store News. New York: Jun. 6, 2005. vol. 27, Iss. 8; p. 6, 1 pgs.*

(Continued)

*Primary Examiner* — Timothy Padot
(74) *Attorney, Agent, or Firm* — Thomas | Horstemeyer, LLP (57) ABSTRACT

The present disclosure relates to a customer flow line and customer flow hot zone determining method and apparatus. The customer flow line determining method comprises: receiving coordinate data sent from multiple mobile devices, wherein an environment in which the multiple mobile devices are located is divided into a plurality of grids; on the basis of the coordinate data of each mobile device, determining the grid to which each mobile device belongs; determining the number of the mobile devices in each grid; and on the basis of the number of the mobile devices in each grid, outputting a customer flow line distribution map.

18 Claims, 10 Drawing Sheets

(58) Field of Classification Search
USPC .......................................................... 705/7.34
See application file for complete search history.

(56) References Cited

U.S. PATENT DOCUMENTS

2014/0012806 A1* 1/2014 Ching .................. H04W 4/029
707/609
2015/0066551 A1* 3/2015 Harada .................. G06Q 30/02
705/7.11
2015/0242899 A1* 8/2015 Farhi .................. G06Q 30/0261
705/14.58
2015/0324812 A1* 11/2015 Wang ................. G06Q 30/0201
455/456.1

FOREIGN PATENT DOCUMENTS

| CN | 103578265 A | 2/2014 |
| CN | 103902636 A | 7/2014 |
| CN | 103996068 A | 8/2014 |
| CN | 105469378 A | 4/2016 |
| CN | 106708955 A | 5/2017 |
| CN | 109272351 A | 1/2019 |
| EP | 2579191 A1 | 4/2013 |
| EP | 2942748 A1 | 11/2015 |

OTHER PUBLICATIONS

How do smartphones reveal shoppers' movements?: The Economist explains. The Economist (Online) The Economist Newspaper NA, Inc. (Jul. 21, 2013).*
Shoppers' phones helping retailers track movements? Kerr, Jennifer. Telegraph—Herald [Dubuque, Iowa] Feb. 23, 2014: B.9.*
International Search Report and Written Opinion dated Nov. 27, 2019 for PCT Patent Application No. PCT/CN2019/102633.
First Office Action for CN Patent Application No. 201811015132.6 dated May 8, 2021.

* cited by examiner

CUSTOMER FLOW LINE AND CUSTOMER FLOW HOT ZONE DETERMINING METHOD AND APPARATUS

CROSS-REFERENCE TO RELATED APPLICATIONS

This application is a § 371 national phase entry of International Application No. PCT/CN2019/102633, filed Aug. 26, 2019, which is based upon and claims priority to Chinese Patent Application 201811015132.6, filed Aug. 31, 2018, the entire contents of which are incorporated herein by reference.

TECHNICAL FIELD

The present disclosure relates to data processing technologies and, in particular, to a method and device for determining customer flow lines, and a method and device for determining customer flow hot zones.

BACKGROUND

In recent years, the retail industry has faced development bottlenecks. Although the size of the online retail market has continued to grow, the growth rate has slowed significantly. The offline retail market has been affected by the online retail market and the impact has not been eliminated. The development of new technologies, such as cloud computing, big data, and the Internet of Things (IoT) are bringing changes in the retail industry. Consumers' consumption habits have undergone tremendous changes. It has become an industry consensus that the "new retail" era is coming. Retailers now need to rely on new technologies to develop new models.

For large supermarkets, the layout of stores and product display is an important factor to increase product sales, and a good layout of stores and product display can become a silent marketing strategy. A scientific and reasonable store layout and product display can maximize corporate profits. At present, there is a lack of offline data, and there is no solution to improve the overall layout of shopping malls. Therefore, technologies that integrate artificial intelligence and big data are needed to solve the industry problems of new retail.

It should be noted that the information disclosed in the Background section above is only for enhancing the understanding of the background of the present disclosure and thus, may include information that does not constitute prior art known to those of ordinary skill in the art.

SUMMARY

According to an aspect of the present disclosure, a method for determining customer flow lines is provided. The method includes:
receiving coordinate data sent from a plurality of mobile devices, wherein an environment where the plurality of mobile devices are located is divided into a plurality of grids;
determining a grid to which each of the plurality of mobile devices belongs based on the coordinate data of each of the plurality of mobile devices;
determining the number of mobile devices in each grid; and
outputting a distribution map of the customer flow lines based on the number of mobile devices in each grid.

According to another aspect of the present disclosure, a method for determining customer flow hot zones is provided. The method includes:
receiving coordinate data sent from a plurality of mobile devices;
clustering the coordinate data of the mobile devices based on the coordinate data sent from the plurality of mobile devices to determine the customer flow hot zones;
determining positions of the hot zones; and
outputting a distribution map of the customer flow hot zones based on the positions of the hot zones.

According to another aspect of the present disclosure, a device for determining customer flow lines is provided. The device includes:
at least one hardware processor; and
a memory storing program instructions executable by the at least one hardware processor;
wherein the at least one hardware processor is configured to execute the method for determining customer flow lines described above.

According to another aspect of the present disclosure, a device for determining customer flow hot zones is provided. The device includes:
at least one hardware processor; and
a memory storing program instructions executable by the at least one hardware processor;
wherein the at least one hardware processor is configured to execute the method for determining customer flow hot zones described above.

According to another aspect of the present disclosure, a device for determining customer flow lines is provided, including:
a first receiving module configured to receive coordinate data sent from a plurality of mobile devices, wherein an environment where the plurality of mobile devices are located is divided into a plurality of grids;
a first determining module configured to determine a grid to which each of the plurality of mobile devices belongs based on the coordinate data of each of the plurality of mobile devices;
a second determining module configured to determine the number of mobile devices in each grid; and
a first processing module configured to output a distribution map of the customer flow lines based on the number of mobile devices in each grid.

According to another aspect of the present disclosure, a device for determining customer flow hot zones is provided. The device includes:
a second receiving module configured to receive coordinate data sent from a plurality of mobile devices;
a third determining module configured to cluster the coordinate data of the mobile devices based on the coordinate data sent from the plurality of mobile devices to determine the customer flow hot zones;
a fourth determining module configured to determine positions of the hot zones; and
a second processing module configured to output a distribution map of the customer flow hot zones based on the positions of the hot zones.

According to another aspect of the present disclosure, there is also provided a computer-readable storage medium for storing non-transitory computer-readable instructions, wherein when the non-transitory computer-readable instructions are executed by a computer, the methods described above are performed.

BRIEF DESCRIPTION OF THE DRAWINGS

The above and other features and advantages of the present disclosure will become more apparent by describing its exemplary embodiments in detail with reference to the accompanying drawings. It is apparent that the drawings in the following description are only some embodiments of the present disclosure, from which, other drawings may be acquired by those ordinary skilled in the art without paying any creative labor. In the drawings.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The described features, structures, or characteristics in one or more embodiments may be combined in any suitable manner. However, those skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring various aspects of the present disclosure.

In addition, the drawings are merely schematic representations of the present disclosure and are not necessarily drawn to scale. The same reference numerals in the drawings denote the same or similar parts, and the repeated description thereof will be omitted.

In the new retail scenario, data can be collected through a series of intelligent hardware, such as shopping carts and shelves. For example, a device such as a camera and/or a positioning system on a shopping cart can be used to collect user data, position data, behavior data, item data, and the like. Alternatively, a camera on an intelligent shelf can be used to collect user data, behavior data, item data, and the like. The collected data is uploaded to a big data processing platform through a cloud service for data storing and processing.

The analysis of the customer flow lines and the hot zones in a shopping mall or supermarket can reflect whether the overall layout of the shopping mall or supermarket is reasonable. The selection of the goods and the goods layout analysis can be optimized later in combination with the goods sales.

In the technical solutions according to embodiments of the present disclosure, the analysis functions for the customer flow lines and the customer flow hot zones are achieved by using the big data mining algorithm and the big data visualization technology, thereby facilitating fine management of layout in a shopping mall or supermarket, or the like.

The customer flow line represents the absolute number of the customers passing by. The line representing a large number of the customers passing by is called the customer flow line. The customer flow hot zone refers to a zone with dense points on a plane figure, that is, the zone where customers stay for a relative long time. By analyzing the customer flow lines and the hot zones, customer's attention to goods and shelves in a supermarket or a shopping mall can be determined, so as to determine the potential needs of the customers, and rationally arrange the shelves in the shopping mall or the supermarket.

Figure 1:
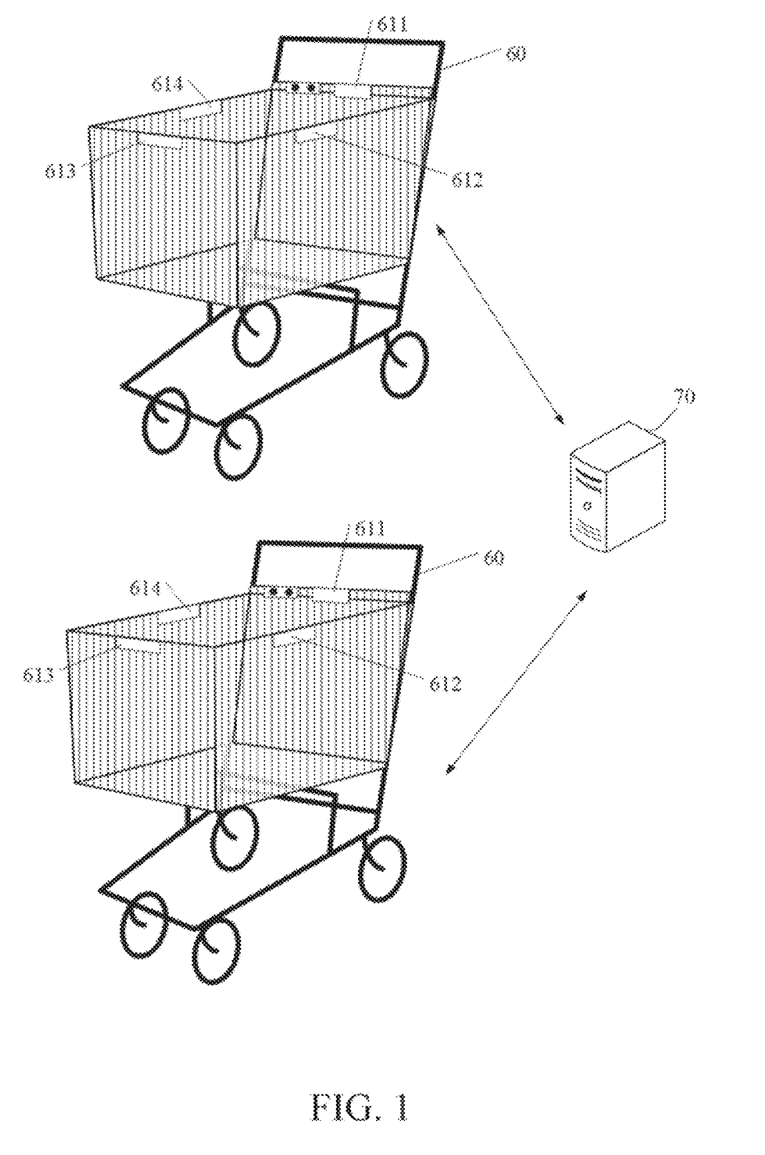
FIG. 1 shows an implementation environment involved in embodiments of the present disclosure.

FIG. 1 shows an implementation environment involved in embodiments of the present disclosure. The environment includes a plurality of shopping carts 60 and a server 70. Cameras 611, 612, 613, and 614 can be set on four side walls of a shopping cart 60. These cameras 611, 612, 613, and 614 can capture user's behavior data, as well as electronic tags of items taken or put in by users. The user's behavior data and the electronic tags are transmitted to the server 70, which may include one or more servers 70. The server 70 may be a cloud server, and the cameras 611, 612, 613, and 614 may communicate data with the server 70 based on cloud technologies. A positioning device may also be provided on the shopping cart, and the position information of the shopping cart (for example, coordinate data of the shopping cart) may be determined through the positioning device. The position information can also be transmitted to the server 70 through the cloud technologies.

The cameras can also be disposed on the shelves in the supermarket, and various data captured by these cameras can also be transmitted to the server 70. The server 70 may store and process the received data, and a big data platform may be run in the server 70.

Figure 2:
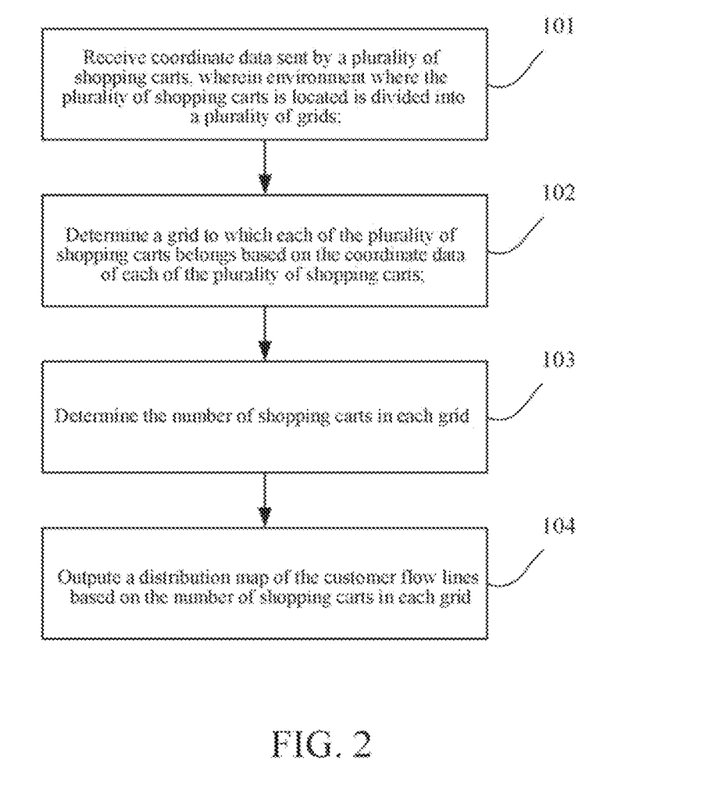
FIG. 2 shows a flowchart of a method for determining customer flow lines according to an embodiment of the present disclosure.

FIG. 2 shows a flowchart of a method for determining customer flow lines according to an embodiment of the present disclosure. The method includes:

In step 101, coordinate data sent from a plurality of mobile devices is received. An environment where the plurality of mobile devices are located is divided into a plurality of grids.

In step 102, a grid to which each of the plurality of mobile devices belongs is determined based on the coordinate data of each of the plurality of mobile devices.

In step 103, the number of mobile devices in each grid is determined.

In step 104, a distribution map of the customer flow lines is output based on the number of mobile devices in each grid.

In the technical solutions provided by the embodiments of the present disclosure, the mobile devices may be shopping carts or other electronic devices that customers can carry with them.

In the following examples, the shopping cart is taken as an example to describe embodiments in detail. The environment (for example, the shopping mall or the supermarket) where the plurality of shopping carts are located is divided into a plurality of grids. The number of shopping carts in each grid is determined based on the coordinate data of the plurality of shopping carts, and the distribution of the customer flow lines can be determined based on the number of the plurality of shopping carts in each grid. In this way, the distribution of the customer flow lines in shopping malls or supermarkets can be provided, thereby facilitating fine management of layout of goods by the supermarket or the shopping mall.

The details of the method are described below.

In the shopping mall or the supermarket, the positioning devices are provided on the shopping carts or the shelves, and these positioning devices can send coordinate data of each shopping cart to the server. For example, the coordinate data for a certain shopping cart is denoted as $(X_{cj}, Y_{cj})$.

Figure 3:
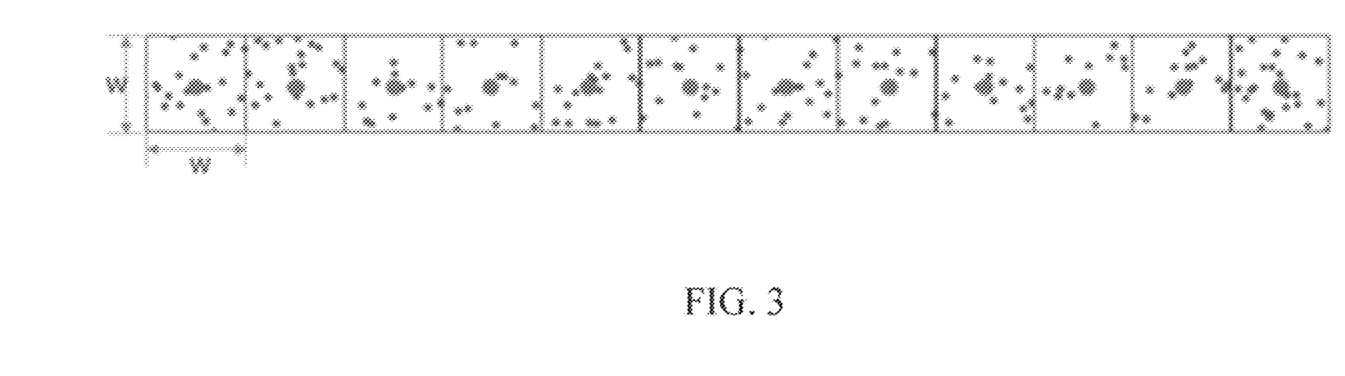
FIG. 3 shows an example of gridding a mall or supermarket.

In embodiments of the present disclosure, the shopping mall or the supermarket can be gridded, that is, the shopping mall or supermarket (especially the passage) is divided into a plurality of grids, assuming that the side length of each grid is w. As shown in FIG. 3, the number of the grids can start from 0.

Next, the server can determine the grid to which each shopping cart belongs based on the coordinates of each shopping cart. For example, the horizontal and vertical coordinates in the coordinate data of each shopping cart are rounded with respect to the side length of the grid to determine the grid to which each shopping cart belongs. For example, by rounding $X_c/w$ and $Y_c/w$, the calculation result is the position of the grid where the shopping cart is located.

The following example shows how to determine the grid to which each shopping cart belongs by the rounding operation. This example is only used to explain the process of determining the grid to which each shopping cart belongs, and does not limit the present disclosure. For example, several grids with a side length of 3 are in an X-Y coordinate system, and the origin of the coordinate system is at the vertex of the grid. When the coordinates of a certain shopping cart in the coordinate system are (5, 8), the rounding operation (that is, 5/3, 8/3) can be used to determine which grid of the coordinate system the shopping cart is in.

After determining the grid in which each shopping cart is located, the number of shopping carts in each grid can be determined. In the shopping mall or the supermarket, customers will push the shopping cart to move in the shopping mall or the supermarket, and the shopping cart will continuously collect data (for example, data can be collected 3 times in one minute). If the customer moves slowly, the customer will appear a plurality of times in a grid within a certain period of time, which means that the coordinate data of the shopping cart corresponding to the customer will appear a plurality of times, which will cause data duplication. In order to improve the statistical accuracy, duplication eliminating is performed on the data corresponding to the same shopping cart in the first preset time period in the same grid to determine the number of shopping carts in each grid. For example, if the ID of a shopping cart (corresponding to a user) occurs more than one time in a certain grid in the first preset time period (for example, 1 minute, 1 hour, etc., which can be determined according to the analysis requirements of the customer flow lines), the duplicate data corresponding to the ID can be deleted, and only one piece of the data corresponding to the ID within this time period is kept.

Next, the color representations of different grids are drawn based on the number of shopping carts in each grid, and the distribution map of the customer flow lines is obtained and output. The number of shopping carts in each grid is different, and the colors of the different grid are drawn based on the number of shopping carts. For example, a grid with a large number of shopping carts corresponds to a large number of the customers, and this grid can be drawn as red. A grid with a small number of shopping carts corresponds to a small number of the customers, and this grid can be drawn as green. In this way, the distribution map of the customer flow lines is obtained.

The process of obtaining the distribution map of the customer flow lines is briefly introduced as follows. According to the number of shopping carts, the corresponding grid is drawn to the prescribed corresponding color, and the grids of the same color can be considered as the points constituting the corresponding customer flow line. A plurality of grids of the same color can form a customer flow line. Finally, the distribution map of the customer flow lines are formed by the customer flow lines formed by the plurality of grids of different colors.

In addition, the graphic representation of each shopping car is drawn based on the coordinate data of each shopping cart. For example, if the coordinates of a certain shopping cart are (X, Y), and the coordinates are used as the origin to draw a square with a side length of 1 pixel (i.e., the graphic representation of the shopping cart).

Figure 4:
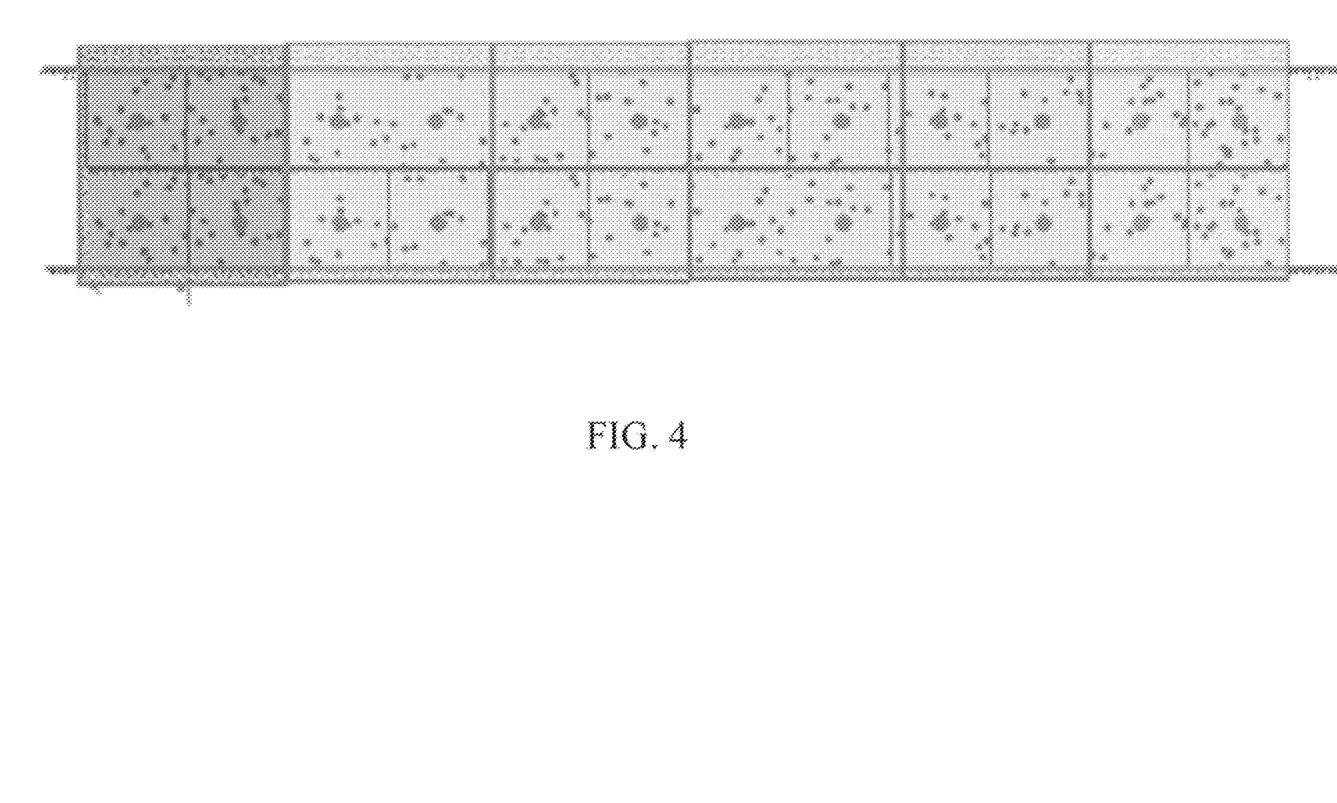
FIG. 4 shows an example of a distribution of customer flow lines.

FIG. 4 shows an example of a distribution of customer flow lines. The coordinates of the upper-left corner of the figure are (0, 0). The dots in the squares of the figure represent the shopping carts. Each large square represents each grid. The dot in the center of the square represent the center of the grid, and the grids with different flow densities are filled with different colors. The example in FIG. 4 shows the graphic representations of the shopping carts, but in other examples, the graphic representations of the shopping carts may be omitted, and the grids with different flow densities only may be displayed by different colors, thereby reflecting the distribution of the customer flow lines.

According to an embodiment, timestamp data corresponding to the coordinate data sent from a plurality of shopping carts may also be received. For example, when each shopping cart uploads its coordinate data, the timestamp data corresponding to the coordinate data may be sent to the server. Each shopping cart can collect the coordinate data and upload it to the server, and the timestamp data can reflect the time when the coordinate data was acquired by the shopping cart.

The server determines the number of shopping carts with timestamps in the second preset time period in each grid, and outputs the distribution map of the customer flow lines corresponding to the second preset time period based on the number of shopping carts with timestamps in the second preset time period in each grid.

By providing the timestamps to the server, it is possible to obtain the distribution map of the customer flow lines corresponding to a specific time period. For example, because each coordinate data has an associated timestamp, if there is a need to analyze the customer flow lines for a specific time period on a day (for example, 10 am to 11 am), the distribution of the customer flow lines from 10 am to 11 am of the day is obtained based on the number of shopping carts in each grid in combination with the coordinate data whose the timestamps fall within the time period form 10 am to 11 am of the day. For example, the distribution map of the customer flow lines may reflect the graphical representations of the shopping carts in each grid from 10 am to 11 am on the day, and the grids with different numbers of shopping carts may be represented in different colors.

The methods provided by the above embodiments of the present disclosure may be implemented by software running in a server. Specifically, when it is necessary to output the distribution map of the customer flow lines, shopping cart IDs, user IDs, the coordinate data of the shopping carts, the timestamp, and the grid side length w can be input to the server. The server can draw the distribution of the customer flow lines through the above method, mainly including the grid coordinates, the grid side length w and the customer flows in the grid.

Figure 5:
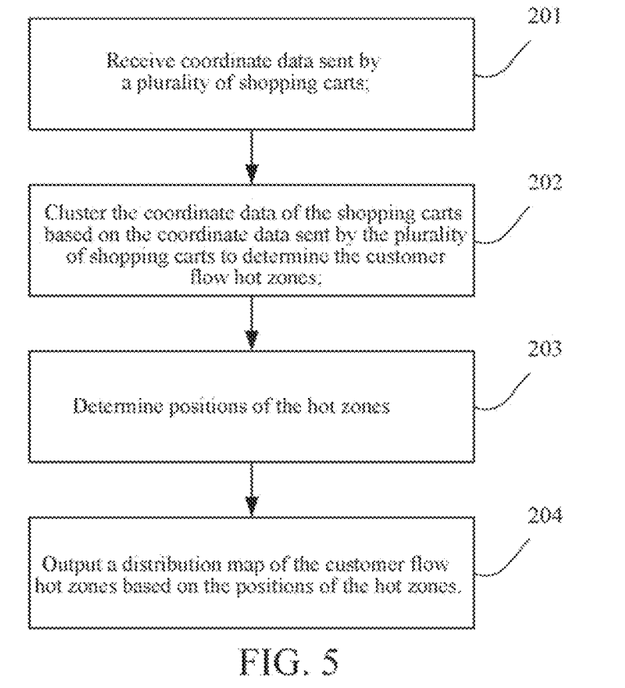
FIG. 5 shows a flowchart of a method for determining customer flow hot zones according to an embodiment of the present disclosure.

FIG. 5 shows a flowchart of a method for determining customer flow hot zones according to an embodiment of the present disclosure. The method includes:

In step 201, coordinate data sent from a plurality of mobile devices is received.

In step 202, the coordinate data of the mobile devices is clustered based on the coordinate data sent from the plurality of mobile devices to determine the customer flow hot zones.

In step 203, positions of the hot zones are determined.

In step 204, a distribution map of the customer flow hot zones is output based on the positions of the hot zones.

The technical solutions provided by the embodiments of the present disclosure will be described in detail below, and the mobile device are shopping carts for example.

In the technical solutions provided by the embodiments of the present disclosure, the coordinate data of the mobile devices is clustered based on the coordinate data of a plurality of mobile devices to determine the customer flow hot zones, and the positions of the hot zones are determined, and a distribution map of the customer flow hot zones is output. In this way, the distribution of the hot zones in shopping malls or supermarkets can be provided, thereby facilitating fine management of layout of goods by the supermarket or the shopping mall.

The details of the methods are described below.

On the plane figure of a shopping mall and a supermarket, the hot zone refers to a zone where there is a high customers density, that is, a zone where customers stay for a relatively long time. The customer flow data collected by the smart shopping carts is usually uploaded to the server in the form of shopping cart IDs, user IDs, time, and positions, and the server processes and stores the data.

Figure 6:
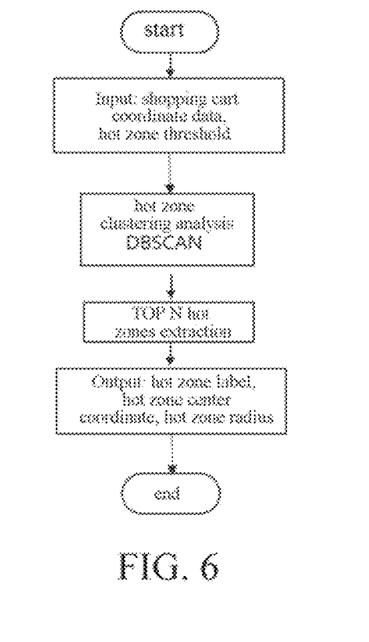
FIG. 6 shows an overall flow of a hot zone determination algorithm.
Figure 7:
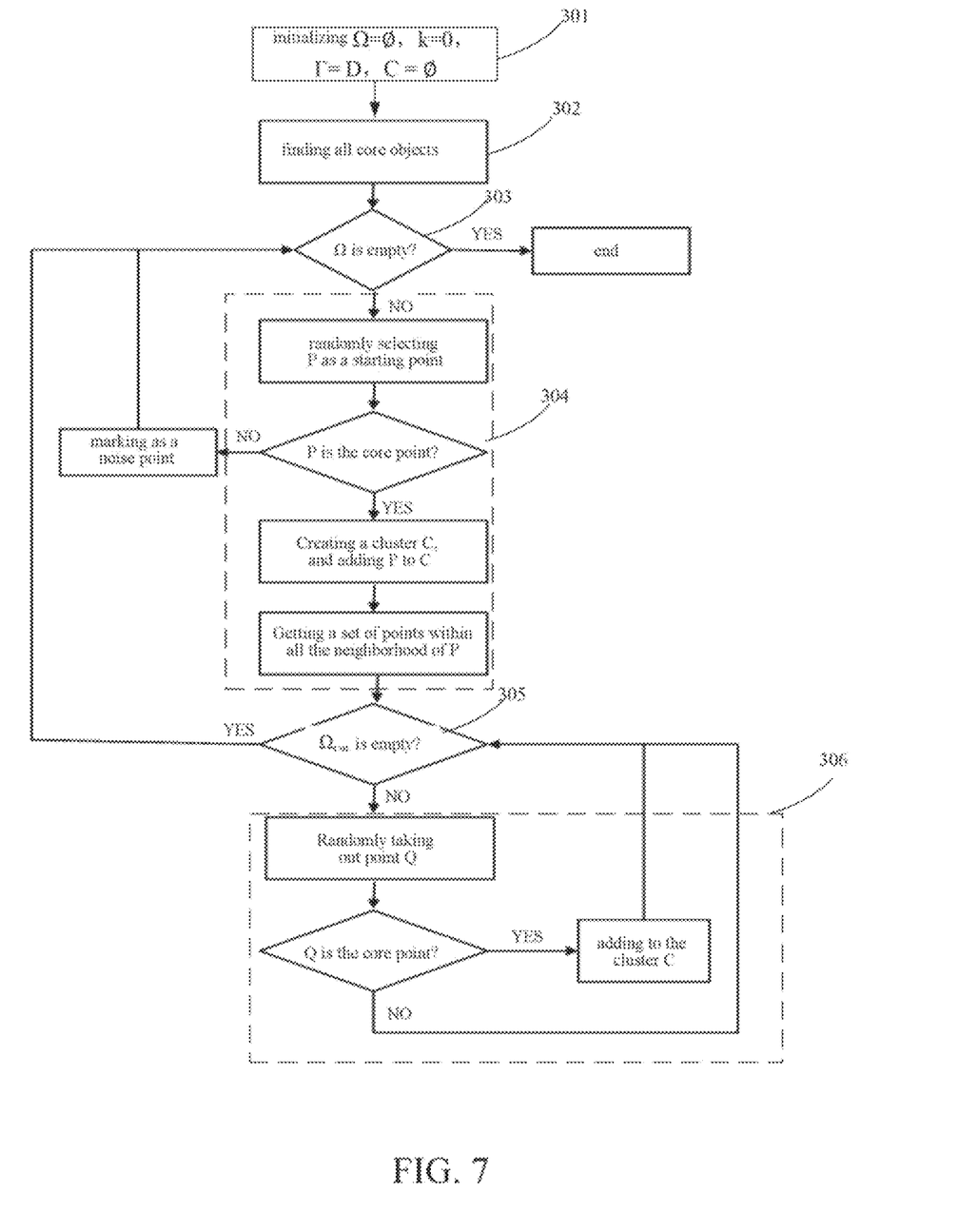
FIG. 7 shows a flow of DBSCAN algorithm.

In the methods disclosed in the present disclosure, the shopping carts can be clustered using a DBSCAN (Density-Based Spatial Clustering of Applications with Noise) algorithm to determine the hot zones in which the number of shopping carts exceeds a quantity threshold. FIG. 6 shows an overall flow of a hot zone determination algorithm. FIG. 7 shows a flowchart of the DBSCAN algorithm.

The algorithm is as follows:

The input of the algorithm is: sample set $D=(z_1, z_2, \ldots, z_m)$, neighborhood parameter ($\epsilon$, MinPts), a measure for the sample distance, where E is a threshold of the neighborhood distance of a certain sample, and MinPts is a threshold of the number of samples in the neighborhood distance $\epsilon$ from the certain sample.

The output of the algorithm is: cluster C.

In step 301, the core object set is initialized, $\Omega=\emptyset$, the number of clustering clusters is initialized, k=0, the unvisited sample set is initialized $\Gamma=D$, and cluster partition is initialized, $C=\emptyset$.

In step 302, next, for j=1, 2, ... m, the following steps are performed to find all core objects (all points of the set $\Omega$ are labeled as unvisited):
a) the $\epsilon$-neighborhood sub-sample set $N_\epsilon(z_j)$ of the sample $z_j$ is found in a manner of distance measure.
b) If the number of samples in the sub-sample set satisfies $|N_\epsilon(z_j)| \geq MinPts$, the sample $z_j$ is added to the core object sample set: $\Omega=\Omega \cup \{z_j\}$.

In step 303, if the core object set is $\Omega=\emptyset$, the algorithm ends; otherwise, the flowchart proceeds to step 304.

In step 304, a core object P is randomly selected from the core object set $\Omega$, and P is selected as the starting point, the core object queue in the current cluster is initialized: $\Omega_{cur}=\{P\}$, and the category number is initialized: k=k+1, the sample set in the current cluster is initialized: $C_k=\{P\}$, and the unvisited sample set is updated: $\gamma=\Gamma-\{P\}$.

In step 305, if the core object queue is $\Omega_{cur}=\emptyset$, the current clustering cluster $C_k$ is generated, and the cluster partition is updated: $C=\{C_1, C_2, \ldots, C_k\}$, the core object set is updated: $\Omega=\Omega-C_k$, and then the method goes to step 303.

In step 306, if the core object queue $\Omega_{cur}$ in the current cluster is not empty, a core object P' is taken out from the core object queue cur in the current cluster, and all the $\epsilon$-neighborhood sub-sample sets N$\epsilon$(, P') are found according to the neighborhood distance threshold $\epsilon$, let $\Delta$=N$\epsilon$(P') $\cap \Gamma$, and the sample set in the current cluster is updated: Ck=Ck$\cup \Delta$, the unvisited sample set is updated: $\Gamma=\Gamma-\Delta$, $\Omega$cur is updated: $\Omega$cur=$\Omega$cur$\cup$(N$\epsilon$(P') $\cap \Omega$), and then the method goes to step 305 to continue to find the core point and add it to C.

The output is: cluster $C=\{C_1, C_2, \ldots, C_k\}$.

The clusters obtained through the above steps are the customer flow hot zones. After that, the positions of the hot zones can be determined. The position of a hot zone may include a center point and a radius of the hot zone. For example, the horizontal and vertical coordinates of all shopping carts in each hot zone can be averaged to obtain the average of the horizontal coordinates and the average of the vertical coordinates, and the average of the horizontal coordinates and the average of the vertical coordinates are used as the coordinates of the center point of the hot zone. For example, the coordinates of the center point can be obtained by the following formula:

$$\bar{x}=(x_1+x_2+\ldots+x_n)/n, \bar{y}=(y_1+y_2+\ldots+y_n)/n$$

where, $x_1, x_2, \ldots x_n$ are horizontal coordinates of the shopping carts in each hot zone, $y_1, y_2, \ldots y_n$ are vertical coordinates of the shopping carts in each hot zone, and the coordinates of the center point are $(\bar{x}, \bar{y})$.

The radius of the hot zone is determined based on the horizontal and vertical coordinates of all shopping carts in the hot zone and the average of the horizontal coordinates and the average of the vertical coordinates. For example, the radius of the center point can be obtained by the following formula:

$$r = 2 \times \sqrt{\frac{\sum_{i=1}^{n}\{(x_i-\bar{x})^2+(y_i-\bar{y})^2\}}{n}}$$

Where, r is the radius of the hot zone.

By obtaining the center point and radius of the hot zone, the coverage region of each hot zone is regularized, which can provide an accurate basis for subsequent analysis. For example, by regularizing the coverage region of each hot zone, the positions of hot zones, goods, and shopping carts can be associated. Subsequently, if it is detected that the shopping cart appears in a certain hot zone, goods which attract more attention of customers can be recommended.

Then, based on the positions of the hot zones, the distribution map of the customer flow hot zones can be output. For example, the circular region corresponding to each hot zone may be drawn with the center point as the origin and the radius of the hot region as the radius, and each circular region may be filled with different colors based on the number of shopping carts in each hot zone, and the distribution map of the customer flow hot zones is obtained and output.

For example, after determining the center point and radius of each hot zone, a circle can be drawn with ($\bar{x}$, $\bar{y}$) as the origin and radius as r. In addition, each hot zone corresponding to the different number of shopping carts and can be filled with different colors. In addition, the hot zones can be dynamically scaled by 0.5-2 times at regular intervals to form dynamic hot zones.

The methods provided by the above embodiments of the present disclosure may be implemented by software running in a server. For example, when it is necessary to output the distribution map of the customer flow hot zones, shopping cart IDs, user IDs, coordinates, timestamps, and hot zone thresholds can be input to the server, and server can draw the distribution of the customer flow hot zones, mainly including the coordinates of the center of the hot zone, the radius of the hot zone, and the number of customers staying in the hot zones, and so on.

In addition, based on the data the timestamps of which fall into a specific time period, the distribution of the hot zones corresponding to the specific time period can be obtained.

According to an embodiment of the present disclosure, the method for determining customer flow hot zones may further include: receiving timestamp data corresponding to the coordinate data sent from a plurality of shopping carts;

clustering the coordinate data of the shopping carts based on the coordinate data sent from the plurality of shopping carts to determine the customer flow hot zones includes:

clustering the coordinate data of the shopping carts based on the coordinate data of the plurality of shopping carts with timestamps in a third preset time period;

outputting a distribution map of the customer flow hot zones based on the positions of the hot zones includes:

outputting the distribution map of the customer flow hot zones corresponding to the third preset time based on the positions of the hot zones corresponding to the third preset time.

In addition, when the distribution map of the customer flow hot zones is output, the distribution map of the customer flow hot zones being ranked in top N can be output.

For example, the method for determining customer flow hot zones may further include:

determining the number of shopping carts in each customer flow hot zone, and ranking the customer flow hot zones according to the number of shopping carts;

determining the customer flow hot zones in which the number of shopping carts is ranked in top N, where N is a positive integer greater than or equal to 1;

outputting the distribution map of the customer flow hot zones includes:

outputting the distribution map of the customer flow hot zones in which the number of shopping carts is ranked in top N.

In addition, the customer flow hot zones can be ranked according to the radiuses of the hot zones, and the customer hot zones being ranked in top N are output.

For example, according to an embodiment of the present disclosure, outputting a distribution map of the customer flow hot zones based on the positions of the hot zones includes:

ranking the hot zones according to the radiuses;

determining the customer flow hot zones with the radiuses ranked in top N, wherein N is a positive integer greater than or equal to 1; and outputting the distribution map of the customer flow hot zones based on the center points and the radiuses of the customer flow hot zones with the radiuses ranked in top N.

For example, for a plurality of hot zones (for example, 100, or other numbers of hot zones may be possible), after determining the radius of each hot zone, hot zones can be ranked according to the radiuses and the hot zones being ranked in the top N are selected. The distribution map of the customer flow hot zones is output based on the center points and radiuses of the selected top N hot zones. The value of N can be determined according to the specific needs of the analysis of the customer flow hot zones, for example, N is 3 or 5 or 10 or other values. For example, for the large supermarkets or shopping malls, the value of N can be set relatively large, because the large supermarkets or shopping malls have a wide range of brands or goods; for the small supermarkets or shopping malls, the value of N can be set smaller.

Figure 8:
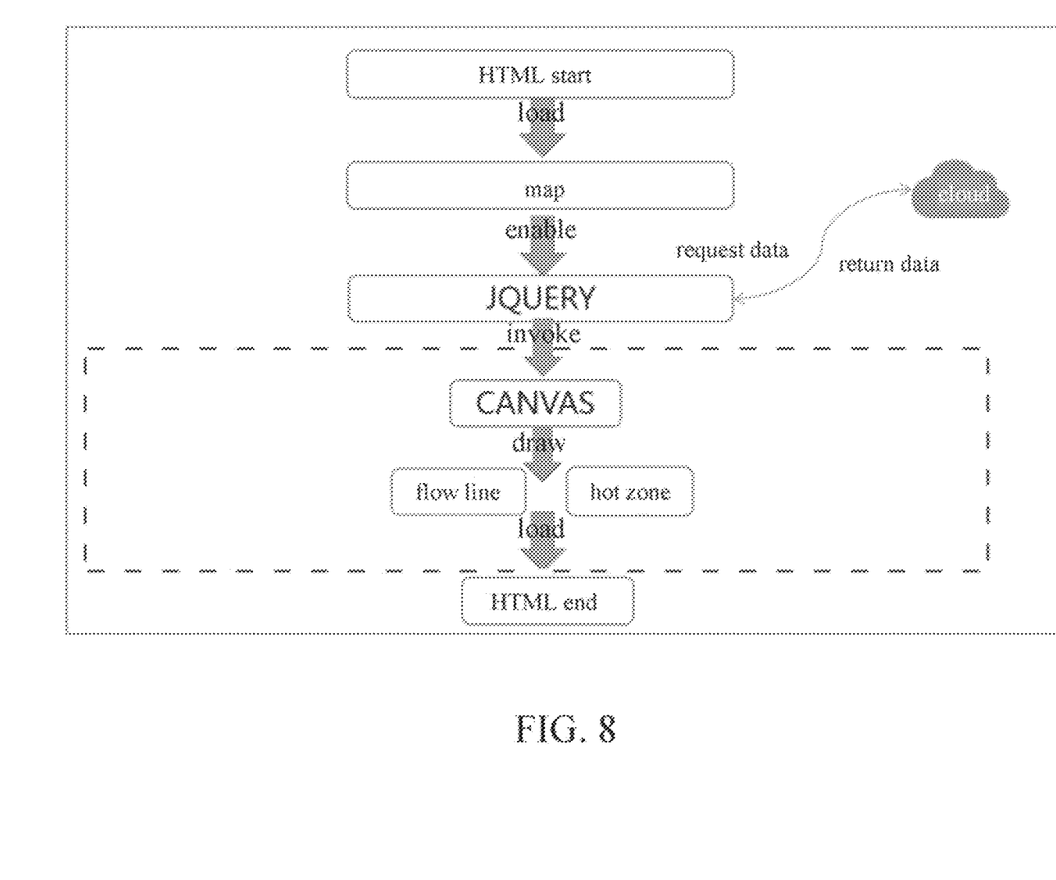
FIG. 8 shows a flow of drawing customer flow lines and hot zones.

The distribution map of the customer flow lines and the distribution map of the customer flow hot zones provided by the present disclosure can be drawn by the same system. FIG. 8 shows a flow of drawing customer flow lines and hot zones, and the drawing process can be implemented by canvas.

Figure 9:
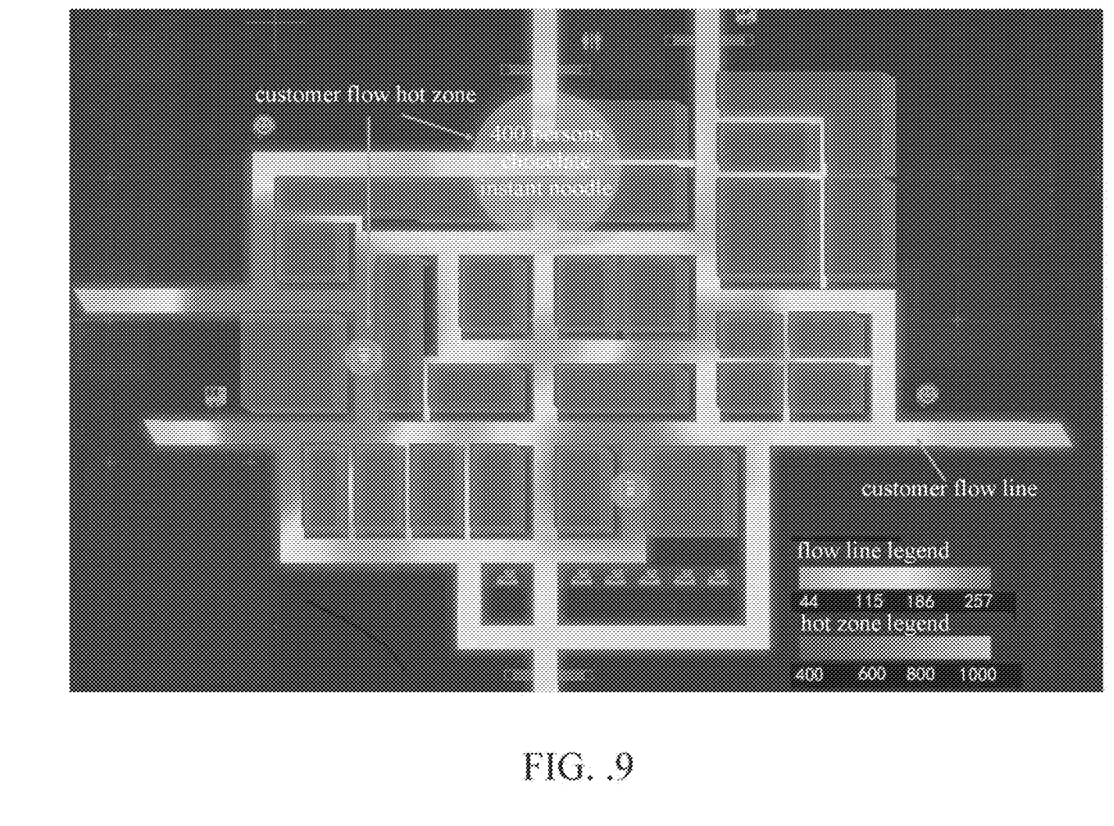
FIG. 9 shows an example of a drawn distribution of customer flow lines and hot zones.

First, the canvas instance model is initialized, and data is requested from the cloud server. After that, drawing objects (flow lines, hot zones, color bars) are started, and the process is finished after drawing the customer flow lines and the hot zones. FIG. 9 shows an example of a drawn distribution of customer flow lines and hot zones.

In other embodiments, the distribution map of the customer flow lines and the distribution map of the customer flow hot zones of the present disclosure can be determined and drawn separately.

Based on the distribution of the customer flow lines and the distribution of the customer flow hot zones as shown in FIG. 9, shopping malls or supermarkets can place corresponding items (such as promotional items, etc.) at the hot zones and the customer flow lines. Moreover, based on the method provided by the present disclosure, visualization of the customer flow lines and the customer flow hot zones are achieved.

Figure 10:
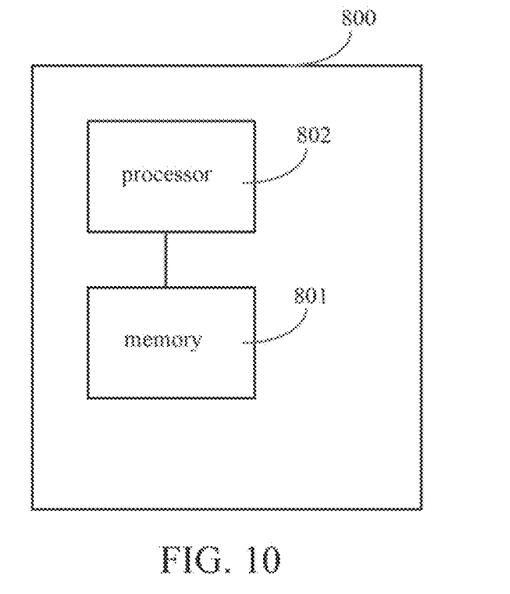
FIG. 10 shows a block diagram of a device for determining customer flow lines according to an embodiment of the present disclosure.

FIG. 10 shows a block diagram of a device for determining customer flow lines according to an embodiment of the present disclosure. The apparatus 800 may be provided in a server, and the device 800 may include a memory 801 and at least one processor 802, such as a hardware processor. The memory 801 stores computer program instructions executable on the at least one processor 802. The at least one processor 802 executes a computer program to implement the method for determining customer flow lines described herein.

The memory 801 may be implemented by any type of volatile or non-volatile storage device or a combination thereof, such as a static random access memory (SRAM), an electrically erasable programmable read-only memory (EEPROM), an erase Programmable Read Only Memory (EPROM), a programmable read only memory (PROM), a read only memory (ROM), a magnetic memory, a flash memory, a disk or an optical disk.

The device 800 may be various devices with computing and processing capabilities. In addition to the memory 801 and the at least one processor 802, it may also include various input devices (such as a user interface, a keyboard, etc.), and various output devices (such as speakers, etc.), and a display device, which will not repeat them herein.

The present disclosure also provides a device for determining customer flow hot zones, which similarly includes a memory and a processor. For the description of the processor and memory, details can be found in the description related to FIG. 10. The memory 801 stores computer program instructions that can be executed on the at least one processor 802. The at least one processor 802 executes a computer program to implement the method for determining customer flow hot zones described herein.

Figure 11:
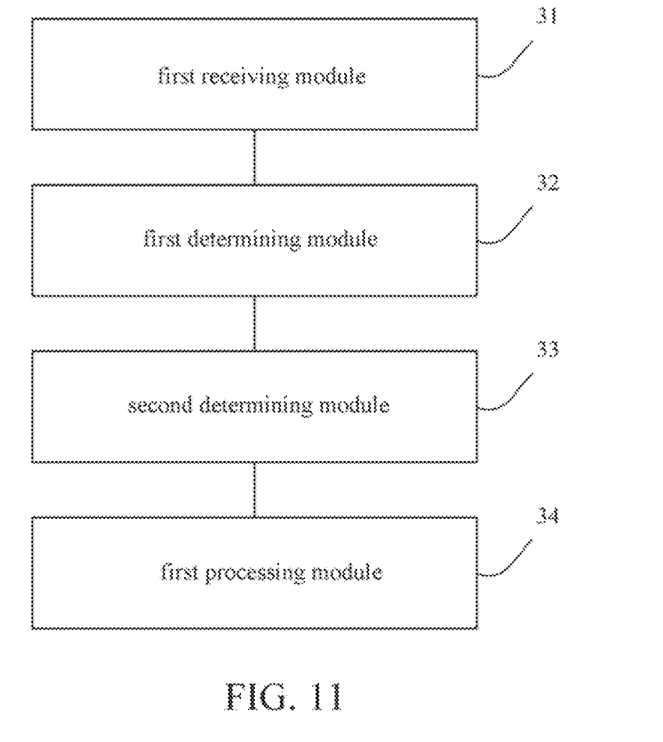
FIG. 11 shows a block diagram of a device for determining customer flow lines according to an embodiment of the present disclosure.

FIG. 11 shows a block diagram of a device for determining customer flow lines according to an embodiment of the present disclosure. The device for determining customer flow lines includes: a first receiving module 31 configured to receive coordinate data sent from a plurality of mobile devices, wherein environment where the plurality of mobile devices are located is divided into a plurality of grids; a first determining module 32 configured to determine a grid to which each of the plurality of mobile devices belongs based on the coordinate data of each of the plurality of mobile devices; a second determining module 33 configured to determine the number of mobile devices in each grid; and a first processing module 34 configured to output a distribution map of the customer flow lines based on the number of mobile devices in each grid.

Figure 12:
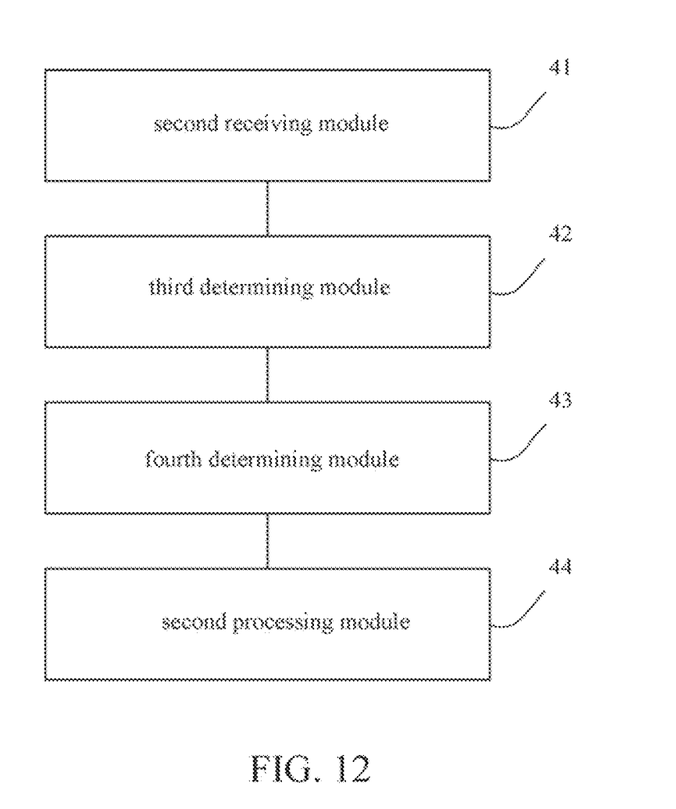
FIG. 12 shows a block diagram of a device for determining customer flow hot zones according to an embodiment of the present disclosure.

FIG. 12 shows a block diagram of a device for determining customer hot zones. The device for determining customer hot zones includes: a second receiving module 41 configured to receive coordinate data sent from a plurality of mobile devices; a third determining module 42 configured to cluster the coordinate data of the mobile devices based on the coordinate data sent from the plurality of mobile devices to determine the customer flow hot zones; a fourth determining module 43 configured to determine positions of the hot zones; and a second processing module 44 configured to output a distribution map of the customer flow hot zones based on the positions of the hot zones.

For the implementation process of each module in FIG. 11 and FIG. 12, reference may be made to the foregoing description of the method embodiment, and details are not described herein again. Each module in FIG. 11 and FIG. 12 can be implemented by software, hardware, or a combination thereof. For example, the device embodiments described above are only exemplary. For example, the device embodiments described above are merely illustrative. For example, the division of the units is only a kind of logical function division. In practice, other division manner may be used. For example, a plurality of units or components may be combined or integrated into another system. Each functional unit in each embodiment of the present disclosure may be integrated in one processing unit, or each unit may exist separately physically, or two or more units may be integrated in one unit. The above integrated units can be implemented in the form of hardware or software functional units.

An embodiment of the present disclosure also provides a non-transitory computer-readable storage medium having a computer program stored thereon. The computer program is executed by at least one processor to cause the at least one processor to implement the steps of the method provided by the embodiments of the present disclosure.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A method for determining customer flow lines, comprising:
   generating, by at least one computing device comprising at least one hardware processor, coordinate data for a plurality of mobile devices based at least in part on data received from the mobile devices and at least one camera positioned in an environment in which the mobile devices are located, the environment being divided into a plurality of grids;
   determining, by the at least one computing device, a grid to which each of the mobile devices belongs based on the coordinate data generated for each of the mobile devices;
   determining, by the at least one computing device, a number of mobile devices in each grid by:
      identifying one or more mobile devices having an identifier occurring more than once in the grid in a first preset time period,
      deleting duplicate data corresponding to the identifier of each of the one or more mobile devices having an identifier occurring more than once in the grid in the first preset time period,
      storing data corresponding to the identifier of each of the one or more mobile devices having an identifier occurring more than once in the grid in within the first preset time period without storing the duplicate data; and
      determining the number of mobile devices in each grid based on the identifier of each of the mobile devices after the duplicate data is deleted; and
   outputting, by the at least one computing device, a distribution map of customer flow lines based on the number of mobile devices in each grid, wherein outputting the distribution map of customer flow lines based on the number of mobile devices in each grid comprises: generating, by the at least one computing device, different color representations of grids based on the number of mobile devices in each of the grids to obtain and output the distribution map of the customer flow lines to at least one client device, wherein each customer flow line in the distribution map of the customer flow lines is formed by a plurality of continuous grids and grids of a same color serve as points constituting a corresponding customer flow line.

2. The method according to claim 1, wherein determining the grid to which each of the mobile devices belongs based on the coordinate data of each of the mobile devices comprises: performing a rounding operation on horizontal and vertical coordinates in the coordinate data of each of the mobile devices with respect to a side length of a grid to determine the grid to which each of the mobile devices belongs.

3. The method according to claim 1, further comprising:
receiving timestamp data corresponding to the coordinate data sent from the mobile devices;
wherein determining the number of mobile devices in each grid comprises: determining the number of mobile devices with timestamps in a second preset time period in each grid; and
wherein outputting the distribution map of the customer flow lines based on the number of mobile devices in each grid further comprises: according to the number of mobile devices with the timestamps in the second preset time period in each grid, outputting the distribution map of the customer flow lines corresponding to the second preset time period.

4. The method according to claim 1, wherein the method is performed by a device for determining customer flow lines, the device comprising:
at least one hardware processor; and
a memory storing program instructions executable by the at least one hardware processor, wherein the at least one hardware processor is configured to execute the method.

5. The method according to claim 4, further comprising, performing, by the at least one computing device, a rounding operation on horizontal and vertical coordinates in the coordinate data of each of the mobile devices with respect to a side length of a grid to determine the grid to which each of the mobile devices belongs.

6. The method according to claim 4, further comprising:
receiving, by the at least one computing device, timestamp data corresponding to the coordinate data sent from the mobile devices;
determining, by the at least server computing device, the number of mobile devices in each grid having coordinate data timestamp of which is in a second preset time period; and
according to the number of mobile devices in each grid having coordinate data timestamp of which is in the second preset time period, outputting, by the at least one computing device, the distribution map of the customer flow lines corresponding to the second preset time period to the at least one client device.

7. The method of claim 1, wherein generating the coordinate data for the mobile devices further comprises generating the coordinate data for the mobile devices based at least in part on data received from a positioning system of a shopping cart located in the environment.

8. The method of claim 1, further comprising:
performing an analysis of the customer flow lines in the distribution map; and
optimizing a layout of a shopping mall or a supermarket comprising the environment based at least in part on the analysis of the customer flow lines and good sales data.

9. A method for determining customer flow hot zones, comprising:
generating, by at least one computing device comprising at least one hardware processor, coordinate data fora plurality of mobile devices based at least in part on data received from the mobile devices and at least one camera located in an environment in which the mobile devices are positioned;
clustering, by the at least one computing device, the coordinate data of the mobile devices based on the coordinate data generated for the mobile devices to determine a plurality of customer flow hot zones;
determining, by the at least one computing device, positions of the customer flow hot zones by:
averaging, by the at least one computing device, horizontal and vertical coordinates of all of the mobile devices in each of the customer flow hot zones to obtain an average of the horizontal coordinates and an average of the vertical coordinates, and using the average of the horizontal coordinates and the average of the vertical coordinates as coordinates of a center point of each of the customer flow hot zones; and
determining, by the at least one computing device, a radius of each of the customer flow hot zones based on the horizontal and vertical coordinates of all of the mobile devices in each of the customer flow hot zones and the average of the horizontal coordinates and the average of the vertical coordinates; and
outputting, by the at least one computing device, a distribution map of the customer flow hot zones based on the positions of the customer flow hot zones, wherein the positions of the customer flow hot zones comprise center points and radiuses of the customer flow hot zones, wherein outputting the distribution map further comprises: drawing a circular region corresponding to each of the customer flow hot zones with the center point as an origin and the radius of each of the customer flow hot zones as a radius to at least one client device; filling each circular region with a different color based on a number of mobile devices in each of the customer flow hot zones to obtain the distribution map of the customer flow hot zones; and dynamically scaling the customer flow hot zones at regular intervals to form a plurality of dynamic hot zones.

10. The method according to claim 9, further comprising:
determining the number of mobile devices in each of the customer flow hot zones, and sorting the customer flow hot zones according to the number of mobile devices; and
determining the customer flow hot zones in which the number of mobile devices is ranked in top N, where N is a positive integer greater than or equal to 1;
wherein outputting the distribution map of the customer flow hot zones comprises: outputting the distribution map of the customer flow hot zones in which the number of mobile devices is ranked in top N.

11. The method according to claim 9, wherein outputting a distribution map of the customer flow hot zones based on the positions of the customer flow hot zones comprises:
drawing a circular region corresponding to each of the customer flow hot zones with the center point as an origin and the radius of each of the customer flow hot zones as a radius, and filling each circular region with a different color based on the number of mobile devices in each of the customer flow hot zones to obtain the distribution map of the customer flow hot zones.

12. The method according to claim 9, wherein outputting the distribution map of the customer flow hot zones based on the positions of the customer flow hot zones comprises:
ranking the customer flow hot zones according to the radiuses;
determining the customer flow hot zones with the radiuses ranked in top N, wherein N is a positive integer greater than or equal to 1; and outputting the distribution map of the customer flow hot zones based on the center points and the radiuses of the customer flow hot zones with the radiuses ranked in the top N.

13. The method according to claim 9, further comprising:
receiving timestamp data corresponding to the coordinate data from the mobile devices;
wherein clustering the coordinate data of the mobile devices based on the coordinate data sent from the mobile devices to determine the customer flow hot zones comprises: clustering the coordinate data of the mobile devices based on the coordinate data of the mobile devices with timestamps in a third preset time period to determine the customer flow hot zones corresponding to the third preset time; and
wherein outputting a distribution map of the customer flow hot zones based on the positions of the customer flow hot zones comprises: outputting the distribution map of the customer flow hot zones corresponding to the third preset time based on the positions of the customer flow hot zones corresponding to the third preset time.

14. The method according to claim 9, wherein the at least one computing device is at least one server computing device.

15. The method according to claim 14, further comprising:
determining, by the at least one server computing device, the number of mobile devices in each of the customer flow hot zones, and sorting the customer flow hot zones according to the number of mobile devices;
determining, by the at least one server computing device, the customer flow hot zones in which the number of mobile devices is ranked in top N, where N is a positive integer greater than or equal to 1; and
outputting, by the at least one server computing device, the distribution map of the customer flow hot zones in which the number of mobile devices is ranked in top N to the at least one client device.

16. The method of claim 9, wherein generating the coordinate data for the mobile devices further comprises generating the coordinate data for the mobile devices based at least in part on data received from a positioning system of a shopping cart located in the environment.

17. The method of claim 9, further comprising:
performing an analysis of the customer flow hot zones in the distribution map; and
optimizing a layout of a shopping mall or a supermarket comprising the environment based at least in part on the analysis of the customer flow hot zones and good sales data.

18. A non-transitory computer-readable storage medium embodying computer-readable instructions, wherein, when the computer-readable instructions are executed by at least one computing device comprising at least one hardware processor, the at least one computing device is directed to perform a method comprising:
generating coordinate data for a plurality of mobile devices based at least in part on data received from the mobile devices and at least one camera positioned in an environment in which the mobile devices are located, wherein the environment being divided into a plurality of grids;
determining a grid to which each of the mobile devices belongs based on the coordinate data generated for each of the mobile devices;
determining a number of mobile devices in each grid by:
identifying one or more mobile devices having an identifier occurring more than once in the grid in a first preset time period,
deleting duplicate data corresponding to the identifier of each of the one or more mobile devices having an identifier occurring more than once in the grid in the first preset time period,
storing data corresponding to the identifier of each of the one or more mobile devices having an identifier occurring more than once in the grid in the first preset time period without storing the duplicate data; and
determining the number of mobile devices in each grid based on the identifier of each of the mobile devices after the duplicate data is deleted; and
outputting a distribution map of a plurality of customer flow lines based on the number of mobile devices in each grid to at least one client device, wherein outputting the distribution map of the customer flow lines based on the number of mobile devices in each grid comprises: generating different color representations of grids based on the number of mobile devices in each of the grids to obtain and output the distribution map of the customer flow lines, wherein each customer flow line in the distribution map of the customer flow lines is formed by a plurality of continuous grids and grids of a same color serve as points constituting a corresponding customer flow line.

* * * * *